United States Patent [19]

Wilkinson

[11] 4,239,240
[45] Dec. 16, 1980

[54] ROTARY MECHANICAL FACE SEALS

[75] Inventor: Samuel C. W. Wilkinson, Chichester, England

[73] Assignee: Crane Packing Limited, Slough, England

[21] Appl. No.: 64,369

[22] Filed: Aug. 7, 1979

[51] Int. Cl.³ .............................................. F16J 15/34
[52] U.S. Cl. ........................................ 277/84; 277/1;
 277/92; 277/121; 277/144; 277/190; 277/165
[58] Field of Search ............ 277/1, 44, 45, 46, 47–50,
 277/38–41, 101, 84, 85, 92, 93 R, 95, 115, 116.2,
 119–122, 143, 144, 145, 165, 190, 191

[56] References Cited

U.S. PATENT DOCUMENTS

| 2,747,903 | 5/1956 | Heinrich | 277/39 |
| 2,877,029 | 3/1959 | Peguet et al. | 277/41 |
| 2,879,094 | 3/1959 | Transeau | 277/120 |
| 3,245,692 | 4/1966 | Voitik | 277/40 |
| 3,322,430 | 5/1967 | Voitik | 277/41 |
| 3,630,532 | 12/1971 | Traub et al. | 277/144 |
| 4,134,595 | 1/1979 | Melville | 277/1 X |

FOREIGN PATENT DOCUMENTS

| 1950912 | 6/1971 | Fed. Rep. of Germany | 277/92 |
| 37933 | 1/1964 | Switzerland | 277/84 |
| 517295 | 1/1940 | United Kingdom | 277/84 |

Primary Examiner—Robert S. Ward, Jr.
Attorney, Agent, or Firm—Scrivener, Parker, Scrivener and Clarke

[57] ABSTRACT

An axially movable seal face member of a rotary mechanical face seal, for example for a ship's stern shaft, is sealed to its associated structure, and at the same time loaded axially, by the wedging action of a ring urged radially between two oppositely inclined annular surfaces on bodies associated with the member and the structure, either the ring or the surfaces or both being of resilient material. The ring could be a rubber O-ring and the surfaces could be two further O-rings. Alternatively the ring could be rigid, or the ring could be resilient but the other two surfaces rigid.

8 Claims, 3 Drawing Figures

ROTARY MECHANICAL FACE SEALS

SPECIFIC DESCRIPTION

This invention relates to rotary mechanical face seals, that is to say, seals in which a stationary and a rotating seal face member are urged axially into face-to-face rubbing contact to form a substantially fluid-tight seal, for example between a shaft and its housing.

Usually one of the relatively rotating seal face members is axially fixed and the other is urged towards it by spring means, for example a helical coil spring surrounding the shaft, or a ring of individual springs lying on a common circle. Another proposal has been to use a circumferentially tensioned hoop-like garter spring acting on a frusto-conical surface, or on oppositely inclined spaced frusto-conical surfaces, to produce the necessary axial force. In all these cases it is also necessary to seal the axially movable member to its associated structure (i.e. to the shaft or to the housing) by means of a secondary seal which is fluid-tight but which allows axial movement. For example it is known to use a wedge seal, or bellows, or an O-ring sliding with respect to a cylindrical surface.

It is also known to combine the functions of the spring means and of the secondary seal by employing a rubber bush to connect the axially movable seal face member to its associated structure. This bush is placed under axial pre-compression to exert the necessary force.

Where there is ample space, the installation and setting up of face seal assemblies of the kinds described present no problem. However, where the axial length available is restricted, and is moreover fixed, it is necessary to apply extra axial compression to the rubber bush or spring means, shortening it to a length less than its working length, in order to fit the seal in place. This situation arises in particular in stern seals for ship's propeller shafts, where the seal is to be assembled between the propeller boss and the stern frame of the ship. Overcompression of the spring means or bush is necessary in order to allow for the engagement of a spigot or a protruding land, which comprises the secondary seal, in the propeller boss. In such an arrangement there is always the risk of the secondary seal being trapped or damaged because it has to be assembled blind. Moreover the assembly operation is time-consuming and, in a large marine installation, it may call for a very considerable force to be exerted.

The aim of the invention is to overcome these drawbacks and to provide a seal construction which can be assembled within a fixed axial space and allows the axial force and secondary seal to be obtained simultaneously and in a manner that can be applied as the final step in the assembly operation.

According to the invention, it is proposed that, in a rotary mechanical face seal assembly, the axially movable seal face member should be simultaneously sealed to its associated structure and urged axially by a combination of two relatively axially movable annular surfaces, oppositely inclined to the axis of the assembly, and converging towards one another, and a hoop-like circumferentially stressed ring making line contact with both surfaces and, by virtue of the inclination, having a wedging action urging them axially apart. One of the surfaces is on a body connected to the seal face member and the other on a body connected to the structure.

Such a seal can be assembled in situ, the two bodies having the inclined surfaces being fitted under zero-stress conditions, then as a final step the ring is fitted, simultaneously loading the seal axially and forming the secondary seal.

In one possible arrangement both bodies are in the form of resilient O-rings and the intervening ring is a third O-ring. Alternatively the intervening ring could be rigid. Another possibility is for both surfaces to be on rigid bodies, the intervening ring being a resilient O-ring, which may itself be enclosed in a rigid hoop to squeeze it radially.

Preferably all the components, i.e. the seal face member, the bodies having the inclined surfaces, and the intervening ring, and any other components in which they are mounted, are of split form so that they can be assembled around the shaft without requiring access to the end of the shaft. This is particularly valuable in the case of stern shaft seals for ships, allowing the entire seal to be assembled into place, or replaced, with the propeller already fitted.

The invention will now be described by way of example with reference to the accompanying drawings, in which.

Figure 1:
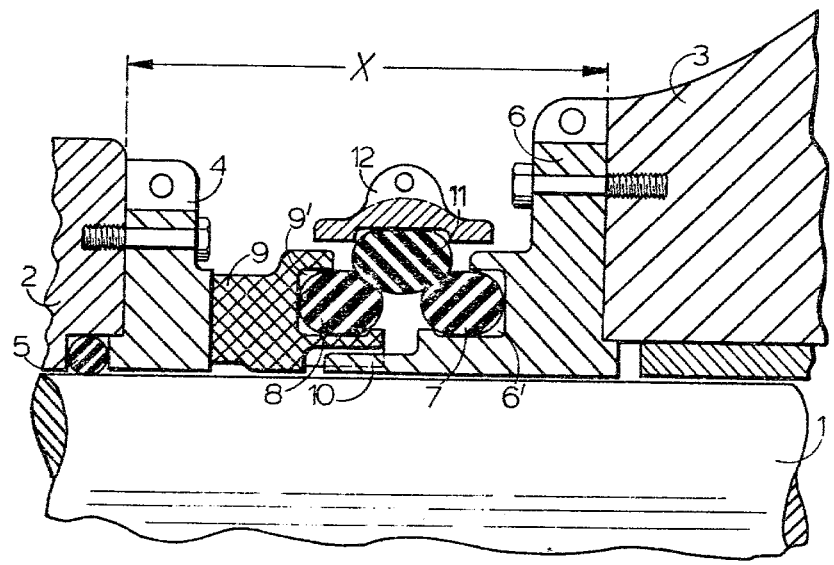
FIG. 1 is a cross-section, in a plane containing the axis, through a ship's stern shaft seal embodying the invention.

Referring first to FIG. 1, a ship's propeller shaft 1 carries a propeller, of which the boss is just visible at 2, and extends through the stern frame of the ship of which a portion is visible at 3. It will be appreciated that, with the shaft and propeller already in situ, the axial length X between the rear face of the frame 3 and the front face of the propeller boss 2 is a fixed dimension that can only be varied by either removing the propeller or uncoupling the propeller shaft, both extremely expensive operations. It will therefore be seen that there is a great advantage in being able to fit the seal, and load it axially, without requiring this dimension to be varied in any way.

An axially fixed seat or wearing ring 4 of split form, for example in two semicircular segments, is bolted onto the face of the propeller 2, trapping and compressing an O-ring 5 that forms a seal between this seat and the propeller. It will be noted that this step can be taken before any of the other parts of the seal assembly are offered up for installation, and so it can be done with ample working space, this being one of the great merits of the design. A mounting ring 6, likewise of split form, is similarly bolted to the stern frame 3.

An annular groove 6' in the ring 6 is designed to receive a rubber O-ring 7 of round cross-section, the groove being of such a shape as to trap and hold the O-ring, that is to say, it partially embraces the O-ring once the O-ring has been forced into place. The O-ring 7 is of split form, i.e. it is cut through at one point, so that it can be fitted into the groove when the ring 6 is already in place. The O-ring 7 is slightly over-length so that its abutting ends are pressed together when it is in the groove.

A second O-ring 8, split in the same way as the ring 7, is received in a groove 9' in a seal face member or wearing ring 9 of carbon or other suitable material. This seal face member 9 is of split form and is placed in face-to-face rubbing contact with the seat 4. Dogs 10 on the after end of the mounting ring 6 engage the seal face member 9 and act in a known manner to prevent it rotating with the seat 4, but without interfering with its freedom to move axially into contact with the seat.

When the components 6 and 9 and the two O-rings 7 and 8 are in place, a third rubber O-ring 11 of split form is wrapped around the two O-rings 7 and 8, and then squeezed radially inwards by a rigid metal hoop 12 of split form fitted around it. The hoop is, for example, in two halves, pulled together by tangential bolts, not shown. It will be seen that, as the hoop 12 is tightened, it will force the O-ring 11 between the other two, making contact with each of them over a region of the surface of each that is inclined to the axis of the seal assembly, the inclinations of the two surfaces being oppositely directed. The resulting wedging action urges the O-rings 7 and 8 axially apart, producing an axial end thrust to force the seal face member 9 into rubbing contact with the seat 4. Moreover, as the O-ring 11 makes contact with each of the other two over a continuous circumferential line it forms an effective secondary seal, sealing the face member 9 to the associated structure formed by the stern frame 3.

The amount of the axial thrust in relation to the stress in the hoop 12 will be dependent on the angle of inclination of the tangents at the lines of contact between the O-rings. This can be varied according to service requirements by selecting the appropriate axial dimensions for the mounting ring 6 and face member 9 in relation to the fixed dimension X. Maximum axial thrust and minimum compression rate are achieved when the axes of the cross-sections of the three rings are nearly in line, whereas a low axial thrust and a low spring rate result from the rings 7 and 8 being close together with the ring 11 outside them.

To accommodate variations in the dimension X in different installations one could select different sizes of O-ring 11; small variations can be accommodated by adjusting the internal diameter of the hoop 12, either by machining it, or by inserting spacers in the butt joints between its segments. Further adjustments of the spring characteristics may be obtained by changing the shape of the cross-section of the O-rings, and/or of the grooves 6' and 9'.

Figure 2:
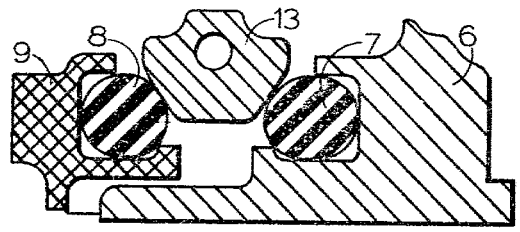
FIG. 2 is a partial section showing a modification to the seal of FIG. 1.

FIG. 2 shows a modification in which the O-ring 11 and the hoop 12 are replaced by a split rigid metal hoop 13 of wedge-shaped cross-section. The spring characteristic and the secondary sealing action are maintained by virtue of the O-rings 7 and 8 still being of rubber.

Figure 3:
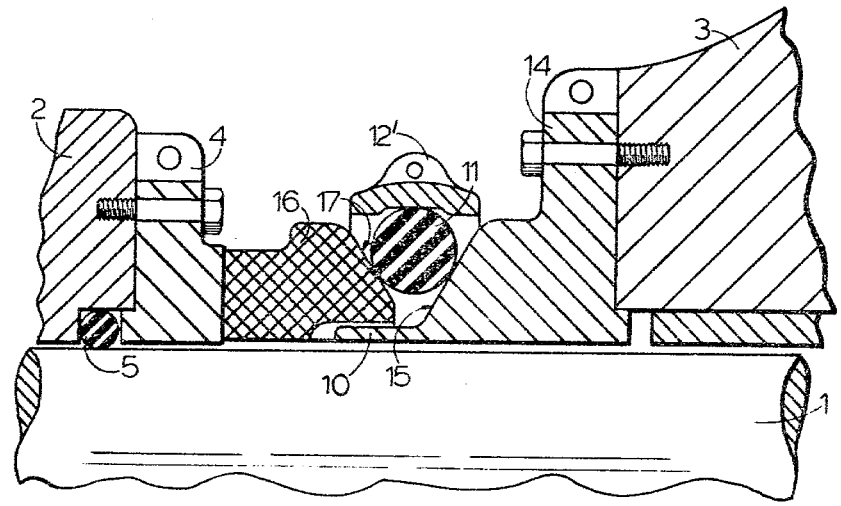
FIG. 3 is a view similar to FIG. 1, showing another embodiment.

FIG. 3 shows a further embodiment. Here the same reference numerals have been used as in FIG. 1 where applicable. The O-ring 11 is retained, with a hoop 12' similar to the hoop 12, but the other two O-rings 7 and 8 have been omitted altogether and replaced by inclined surfaces on rigid bodies. The mounting ring 6 of FIG. 1 is replaced by a mounting ring 14 having a frusto-conical convergent surface 15 with which the O-ring 11 makes line contact. The seal face member 9 is replaced by a member 16 having an inclined surface 17, converging the opposite way to the surface 15, with which the O-ring 11 likewise makes line contact. This is effectively the inverse of the version of FIG. 2. Again there is a wedging and secondary sealing action between a resilient surface and a rigid surface at each of two oppositely inclined surfaces.

It will be understood that the inclinations of the surfaces 15 and 17 to the axis of the assembly need not be equal. Indeed one could be much steeper than the other and in the limiting case one of them could be inclined at 90° to the axis, i.e. in the form of a radial face, provided the other is inclined at a suitable angle to provide the necessary wedging action.

It will be noted that in each of the examples described, the contact that produces the wedging action is either between two resilient surfaces, i.e. those of two O-rings, or between a resilient surface and a rigid surface, so that an effective secondary seal is maintained at all times.

I claim:

1. A rotary mechanical face seal assembly comprising an annular seal face member having an axis, an annular seat, said seat and said seal face member being relatively rotatable about said axis and being in mutual rubbing contact over radial faces thereof, said seat being axially fixed and said seal face member being axially movable, an axially fixed structure with which said seal face member is associated, and with respect to which said seal face member is non-rotatable, a first annular surface associated with said seal face member and a second annular surface associated with said structure, said surfaces being inclined with respect to said axis and converging towards one another, and a hoop-like circumferentially stressed ring, said ring making line contact with said first and second surfaces, thereby forming a seal with each of said surfaces and at the same time having a wedging action by virtue of its circumferential stress, such as to urge said surfaces axially apart and thereby urge said seal face member axially into rubbing contact with said seat.

2. The seal assembly set forth in claim 1 wherein said ring is of resilient material.

3. The seal assembly set forth in claim 2 including further a rigid hoop, said hoop enclosing said ring of resilient material and adapted to squeeze said ring radially inwards.

4. The seal assembly set forth in claim 1 wherein each of said first and second surfaces is the surface of a body of resilient material.

5. The seal assembly set forth in claim 4 wherein said ring is of rigid material and is of wedge-like cross-section.

6. The seal assembly set forth in claim 1 wherein said ring is of resilient material and each of said surfaces is the surface of a body of resilient material.

7. The seal assembly set forth in claim 1 wherein said second surface is on said seal face member itself.

8. The seal assembly set forth in claim 1 wherein said seat, seal face member, ring and first and second surfaces are all of split form.

* * * * *